(12) United States Patent
Fang

(10) Patent No.: US 8,456,145 B2
(45) Date of Patent: Jun. 4, 2013

(54) DEVICE AND METHOD FOR SINGLE BOARD ENERGY-SAVING AND SINGLE BOARD

(75) Inventor: Qingyin Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 13/228,092

(22) Filed: Sep. 8, 2011

(65) Prior Publication Data

US 2011/0316513 A1   Dec. 29, 2011

Related U.S. Application Data

(63) Continuation of application No. PCT/CN2010/070903, filed on Mar. 8, 2010.

(30) Foreign Application Priority Data

Mar. 9, 2009   (CN) .......................... 2009 1 0106027

(51) Int. Cl.
   *G05F 1/00*   (2006.01)
(52) U.S. Cl.
   USPC ............................. 323/266; 323/299; 700/298
(58) Field of Classification Search
   USPC ................... 323/266, 299; 700/286, 297, 298
   See application file for complete search history.

(56) References Cited

U.S. PATENT DOCUMENTS

| | | | |
|---|---|---|---|
| 6,928,559 B1* | 8/2005 | Beard | 713/300 |
| 2004/0217749 A1* | 11/2004 | Orr et al. | 323/299 |
| 2000/7008011 | 1/2007 | Thurston | |
| 2007/0008011 A1* | 1/2007 | Thurston | 326/93 |
| 2007/0145962 A1* | 6/2007 | Huang et al. | 323/283 |

(Continued)

FOREIGN PATENT DOCUMENTS

| | | |
|---|---|---|
| CN | 1811663 A | 8/2006 |
| CN | 1866839 A | 11/2006 |

(Continued)

OTHER PUBLICATIONS

Written Opinion of the International Searching Authority issued in corresponding PCT Patent Application No. PCT/CN2010/070903, mailed Jun. 17, 2010.

(Continued)

*Primary Examiner* — Adolf Berhane
*Assistant Examiner* — Lakaisha Jackson
(74) *Attorney, Agent, or Firm* — Brinks Hofer Gilson & Lione

(57) ABSTRACT

The embodiments of the present invention disclose a single board energy-saving device, which includes: a power calculation module, configured to detect the input current of the single board, and calculate the real-time power of the single board according to the detected input current and a previously measured and obtained input voltage of the single board; a single board energy-saving control module, configured to determine the load condition of the single board according to the real-time power of the single board and send a voltage adjustment command according to the load condition; a power supply adjustment module, configured to receive the voltage adjustment command and adjust the bus voltage of the single board according to the voltage adjustment command. The corresponding embodiments of the present invention also disclose a single board energy-saving method and a single board. Through the foregoing technical solutions, energy-saving is realized for the single board.

12 Claims, 14 Drawing Sheets

U.S. PATENT DOCUMENTS

2007/0263416 A1* 11/2007 Tsai et al. .................. 363/21.03
2008/0059821 A1  3/2008 Xiao
2009/0153108 A1* 6/2009 Hendin et al. ................ 323/234
2010/0112966 A1  5/2010 Yin et al.

FOREIGN PATENT DOCUMENTS

| CN | 1925584 A | 3/2007 |
|---|---|---|
| CN | 1967963 A | 5/2007 |
| CN | 101114860 A | 1/2008 |
| CN | 101593014 A | 12/2009 |
| CN | 101833365 B | 9/2011 |
| WO | WO 2007/137474 A1 | 12/2007 |

OTHER PUBLICATIONS

International Search Report issued in corresponding PCT Patent Application No. PCT/CN2010/070903, mailed Jun. 17, 2010.
Extended European Search Report issued in corresponding European Patent Application No. 10750344.3, mailed Jan. 3, 2012.

* cited by examiner

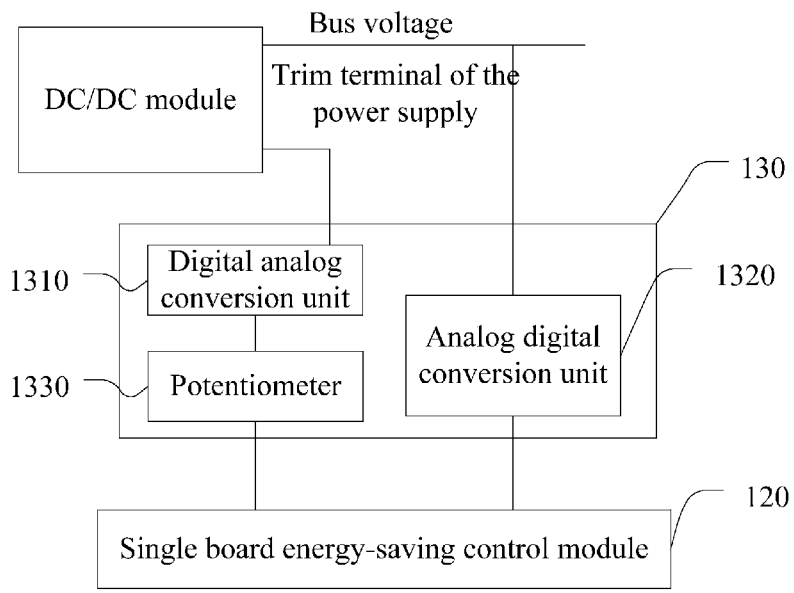
FIG. 8
Replacement Sheet

DEVICE AND METHOD FOR SINGLE BOARD ENERGY-SAVING AND SINGLE BOARD

CROSS-REFERENCE TO RELATED APPLICATIONS

This application is a continuation of International Application No. PCT/CN2010/070903, filed on Mar. 8, 2010, which claims priority to Chinese Patent Application No. 200910106027.8, filed on Mar. 9, 2009, both of which are hereby incorporated by reference in their entireties.

FIELD OF THE INVENTION

The present invention relates to the field of communication power supply, and in particular to a device and method for single board energy-saving device, and a single board.

BACKGROUND OF THE INVENTION

The fast development of semiconductor technologies spurs the continuous advancements of the communication devices in aspects such as function, performance, level of integration, and cost. However, it also poses a vast challenge for communication device manufacturers and operators: The ever-increasing hardware complexity and power consumption of the device makes the operating expenditure (OPEX) of the device increasingly high and the maintenance difficult. Furthermore, enormous tension is confronted in power distribution and heat dissipation of the machine room. For manufacturers, it has become a difficult problem requiring an urgent solution to lower the dynamic operating power of the device and reduce the Total Cost of Ownership (TCO) of the device while maintaining normal operation of the device.

In the prior art, a common approach to realizing dynamic energy-saving for a single board is to control the dynamic energy-saving of the single board through a Center Process Unit (CPU) within the single board. The CPU judges, according to the operating conditions of the single board, whether there are some functional modules that do not need to work. Thereafter, the CPU controls these functional modules so that they enter a dormancy or shut-down state, and thus the operating power consumption of the single board is reduced. When the CPU finds it necessary to have these functional modules in the dormancy or shut-down state work, it will enable or activate these functional modules through corresponding control interfaces.

The application of this approach is limited by the division of the functions of the single board hardware. If the shutting down of a certain functional module affects certain part of service, this approach can only be applied to the circumstances where the affected service is affirmed to be unconfigured or unlaunched. This dynamic energy-saving approach for the single board is independent of the data from the power detection initiated by the single board itself. The overall efficiency and the energy-saving efficiency of the single board are not satisfactory.

SUMMARY OF THE INVENTION

Embodiments of the present invention provide a device and method for single board energy-saving and a single board, which dynamically adjust the bus voltage of the single board according to the power of the single board, and perform dynamic energy-saving on the single board more efficiently without affecting the services of the single board.

An embodiment of the present invention provides a single board energy-saving device, including:

a power calculation module, configured to detect an input current of a single board, and calculate the real-time power of the single board according to the detected input current and a previously measured and obtained input voltage of the single board;

a single board energy-saving control module, configured to determine the load condition of the single board according to the real-time power and send a voltage adjustment command according to the load condition; and a power supply adjustment module, configured to receive the voltage adjustment command and adjust the bus voltage of the single board according to the voltage adjustment command.

An embodiment of the present invention provides a single board energy-saving method, including:

detecting and obtaining an input current of a single board;

calculating the real-time power of the single board according to the input current and a previously measured input voltage of the single board; and determining the load condition of the single board according to the real-time power of the single board, and adjusting the bus voltage of the single board according to the load condition.

An embodiment of the present invention provides a single board including a post-stage power supply module and a post-stage load, where the post-stage power supply module is configured to supply power to the post-stage load, and the single board further includes:

a DC/DC module, configured to convert input voltage of a single board into the bus voltage of the single board; the bus voltage of the single board is configured to supply power to the post-stage power supply module, and the post-stage power supply module converts the bus voltage of the single board into a voltage needed by the post-stage load; and a single board energy-saving device, configured to detect an input current of the single board, calculate the real-time power of the single board according to a previously measured and obtained input voltage of the single board, judge the load condition of the single board according to the real-time power of the single board, and adjust the bus voltage of the single board according to the load condition of the single board.

Through the foregoing technical solutions in the embodiments of the present invention, an input current of a single board is detected, the real-time power of the single board is calculated according to the detected input current and a previously measured and obtained input voltage of the single board, the load condition of the single board is determined according to the real-time power of the single board, and the bus voltage of the single board is dynamically adjusted according to the load condition of the single board. Therefore, a certain functional module of the single board does not need to be shut down or forced to enter a dormancy state. As a result, the overall efficiency of the single board is enhanced and dynamic energy-saving is now more efficiently performed on the single board.

BRIEF DESCRIPTION OF THE DRAWINGS

To illustrate the technical solutions of the embodiments of the present invention or the prior art more clearly, brief introduction to the accompanying drawings to be used in describing the embodiments and the prior art will be given in the following. Obviously, the accompanying drawings are merely some embodiments of the present invention. For those of ordinary skill in the art, other accompanying drawings may be obtained without inventive labor according to these accompanying drawings.

FIG. 8 is a schematic structural diagram of the power supply adjustment module according to an embodiment of the present invention;

DETAILED DESCRIPTION OF THE EMBODIMENTS

In the following, reference will be made to the accompany drawings illustrating the embodiments of the present invention to clearly and completely describe the technical solutions of the embodiments of the present invention. Obviously, the embodiments as shown are only a part, but not all, of the embodiments of the present invention. All other embodiments made by those of ordinary skill in the art based on the embodiments of the present invention, without the expenditure of inventive labor, fall within the protection scope of the present invention.

Figure 1:
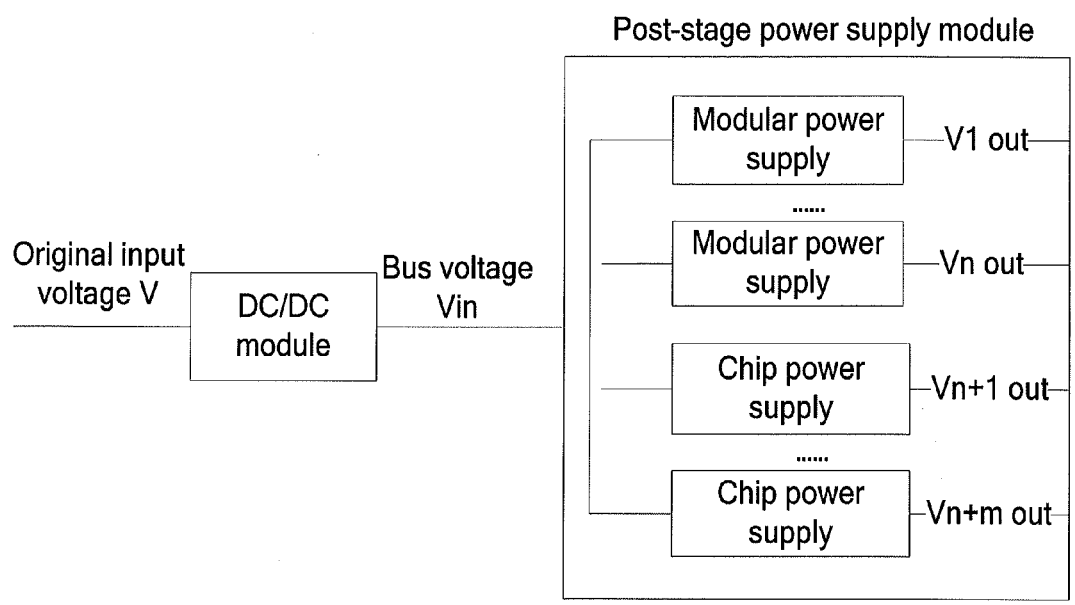
FIG. 1 is a schematic diagram of a single board power supply structure according to an embodiment of the present invention.

FIG. 1 is a schematic diagram illustrating architecture of an exemplary single board power supply. In this figure, a direct current/direct current voltage variation (DC/DC) module is a part of a single board power supply module. The DC/DC module is configured to convert an input voltage V of the single board into a voltage $V_{in}$ suitable for supplying power to a post-stage power supply module. To facilitate the description, the output voltage $V_{in}$ converted by the DC/DC module, that is, the output voltage of the single board power supply module, will be referred to as the bus voltage of the single board. The DC/DC module is referred to as the bus voltage front-stage DC/DC module. Unless otherwise specified, the DC/DC modules shown in the following embodiments of the present invention all refer to the bus voltage front-stage DC/DC module, that is, the DC/DC module of the single board power supply. The bus voltage of the single board, after being converted by a post-stage power supply module, can produce various voltages needed by various parts of the post-stage modules within the single board, such as $V_{1out}$, $V_{nout}$, $V_{n+1out}$, and $V_{n+m\ out}$ in FIG. 1.

Figure 2:
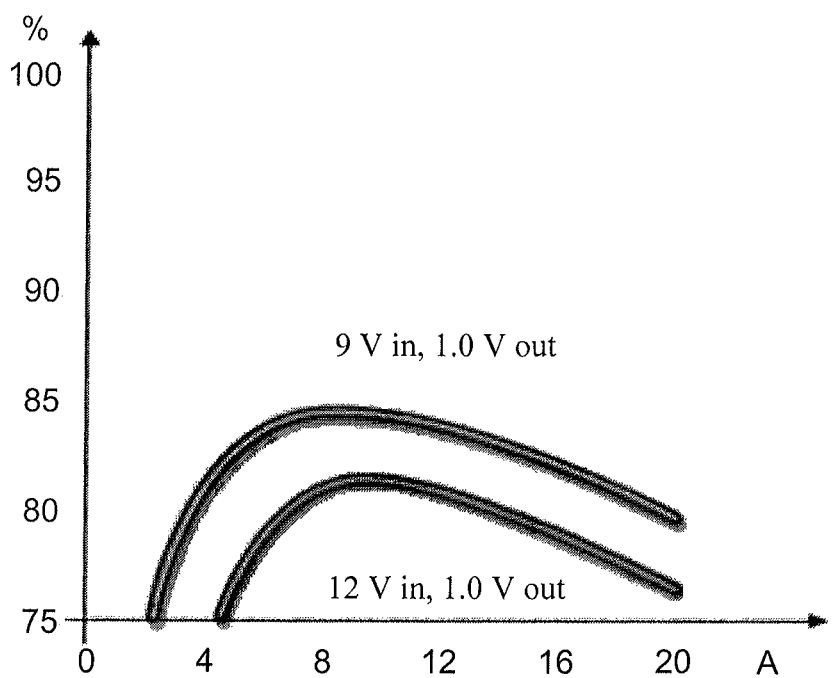
FIG. 2 is a schematic diagram of power supply efficiency relation according to an embodiment of the present invention.

As shown in FIG. 2, in the embodiments of the present invention, according to a test, the efficiency of the single board bus voltage post-stage module can be enhanced in the case that the bus voltage is lowered. As shown in FIG. 2, reducing the bus voltage has little effect on the efficiency of the bus voltage front-stage DC/DC module, but the efficiency of the bus voltage post-stage module may increase. Therefore, after lowering the bus voltage, the overall efficiency of the single board is increased, and thus the energy-saving is realized.

As shown in FIG. 2, when the output voltage of the DC/DC module is 9V, that is, when the single board bus voltage is 9V, the power supply efficiency of the whole single board will be higher than the power supply efficiency of the whole single board when the single board bus voltage is 12V. When the power supply efficiency is increased by 5%, an energy-saving of 5% will be realized for the single board. However, if, in the case of heavy load, the bus voltage is working at a reduced voltage, for example, 9V in FIG. 2, the output current of the front-stage DC/DC module will be excessive under this heavy load condition. This will easily cause overcurrent and over-temperature protection. Therefore, the bus voltage needs to be raised again under the heavy load condition.

To further illustrate the single board, the device and the method for single board dynamic energy-saving, which are provided by the embodiments of the present invention, a detailed description is given below with reference to FIGS. 3 to 11.

Figure 3:
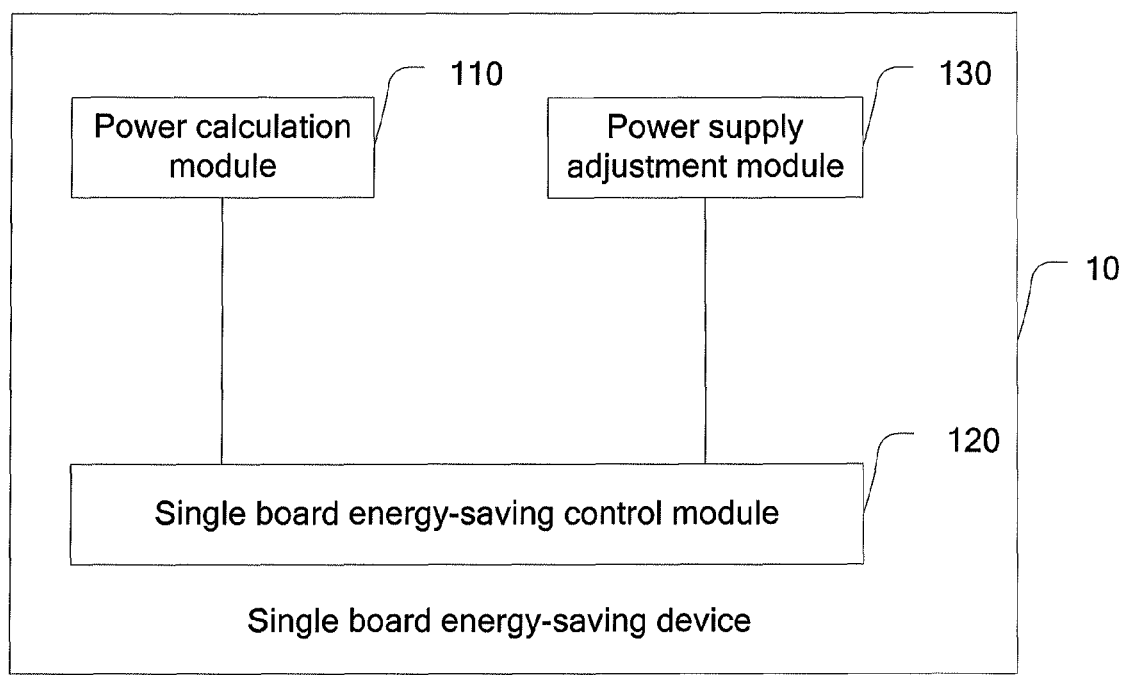
FIG. 3 is a schematic diagram of a single board energy-saving device according to an embodiment of the present invention.

As shown in FIG. 3, an embodiment of the present invention provides a single board energy-saving device 10 for dynamic energy-saving of a single board. The single board energy-saving device 10 includes a power calculation module 110, a single board energy-saving control module 120, and a power supply adjustment module 130.

The power calculation module 110 is configured to detect the input current of the single board, and calculate the real-time power of the single board according to the detected input current and a previously measured and obtained input voltage of the single board.

It should be noted that, generally there are two methods for measuring the power of a single board in the prior art. One is detecting the current by adding a Hall sensor. Due to its precision and cost, this method is rarely used. The other is using a precision resistor and an Analog Digital Converter (ADC) to detect the power. That is, through serial connection of a precision resistor to a single board bus voltage power supply circuit, a current of the bus voltage power supply circuit is converted into a voltage. Then, this small signal voltage is amplified by a precision operating amplifier. The amplified voltage is fed into an ADC for detection. Finally, a processor module acquires the detection result of the ADC via a digital interface and can calculate the power of the single board. The method using a precision resistor plus an ADC for detection enjoys a high precision. However, when the current of the single board is elevated, the thermal loss of the precision resistor will be increased greatly. To meet the heat dissipation requirement, sufficiently large single board area needs to be reserved. In addition, since the main power supply current of the single board passes through the resistor, there is a problem that a failure of the resistor may affect the reliability of the single board.

In the embodiment of the present invention, the power calculation module 110 calculates the electric current based on a voltage difference of a selected part of the Printed Circuit Board (PCB) on the single board bus voltage power supply circuit, and then calculates the power of the single board. As the metal skin of the PCB has a resistance, there is a voltage difference across the selected part of PCB. The measured and obtained voltage difference of this part of the PCB divided by the resistance of the metal skin of this part of the PCB is the input current of the single board. The input voltage of the single board can be measured at one of the two end points of the selected part of PCB, which is generally the one closer to the post-stage load of the single board. After the input voltage and current of the single board is obtained and multiplied with each other, the real-time power of the single board can be obtained.

According to the embodiment of the present invention, the voltage is detected based on a PCB on the bus voltage power supply circuit. Therefore, when the current is elevated, in the embodiment of the present invention, the problem that the precision resistor in prior art may cause great resistor thermal loss will not occur, nor will the problem that the failure of the resistor affect the reliability of the single board. Therefore, the operational reliability of the single board is improved to some extent.

The single board energy-saving control module 120 is configured to judge the load condition of the single board according to the real-time power of the single board, send a voltage adjustment command to the power supply adjustment module 130 according to the load condition of the single board, and control the power supply adjustment module 130 to adjust the bus voltage of the single board.

Specifically, the single board energy-saving module 120 reads the real-time power of the single board calculated by the power calculation module 110, compares the read real-time power of the single board with a pre-set threshold power, determines the load condition of the single board according to the comparison of the real-time power with the pre-set threshold power, and controls the power supply adjustment module 130 to adjust the bus voltage of the single board according to the load condition of the single board, that is, to adjust the output voltage of the single board power supply module. The output voltage of the power supply module refers to the output voltage of the bus voltage front-stage DC/DC module.

Specifically, the single board energy-saving module 120 compares the read real-time power of the single board with a pre-set threshold power. If the real-time power of the single board is higher than the threshold power, the load of the single board is determined to be a heavy load. The single board energy-saving control module 120 controls the power supply adjustment module 130 through a serial control bus or a parallel control bus, and raises the bus voltage of the single board, that is, raises the voltage of the output voltage adjustment terminal, i.e., the trim terminal, of the single board's DC/DC module, thereby raising the output voltage of the DC/DC module.

If the real-time power of the single board is lower than the threshold power, the load of the single board is determined to be a light load. The single board energy-saving control module 120 controls the power supply adjustment module 130 through a serial control bus or a parallel control bus, and lowers the bus voltage of the single board. That is, lower the voltage of the trim terminal of the single board's DC/DC module, thereby lowering the output voltage of the DC/DC module.

The power supply adjustment module 130 is configured to receive a voltage adjustment command sent by the single board energy-saving control module 120, and adjust, under the control of the single board energy-saving module 120, the bus voltage of the single board, that is, the output voltage of the single board power supply module.

Figure 4:
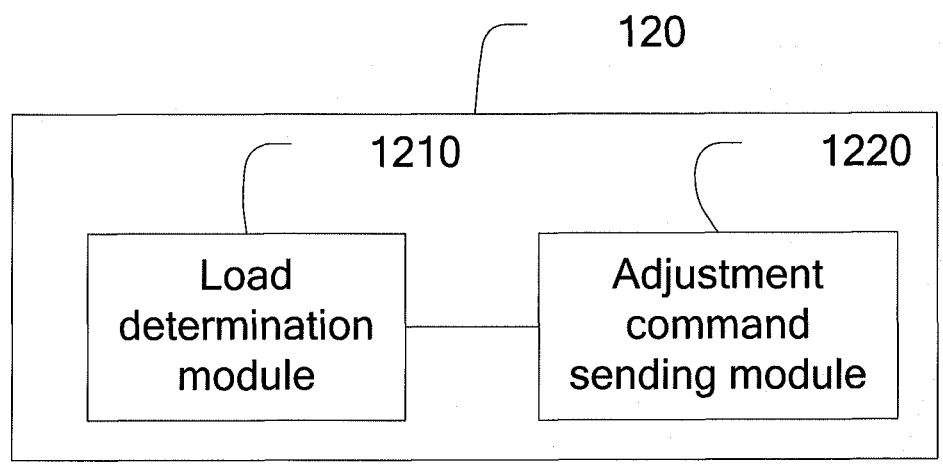
FIG. 4 is a schematic structural diagram of a single board energy-saving control module according to an embodiment of the present invention.

As shown in FIG. 4, in an embodiment, the single board energy-saving control module 120 may include a load determination module 1210 and an adjustment command sending module 1220.

The load determination module 1210 is configured to compare the real-time power of the single board, as calculated by the power calculation module 110 in FIG. 3, with a pre-set threshold power. If the real-time power of the single board is lower than the threshold power, the load of the single board is determined to be a light load; if the real-time power of the single board is higher than the threshold power, the load of the single board is determined to be a heavy load.

The adjustment command sending module 1220 is configured to send a corresponding voltage adjustment command according to the determination of the load determination module 1210. If the load determination module 1210 determines that the load of the single board is a light load, then a voltage lowering command will be sent; if the load determination module 1210 determines that the load of the single board is a heavy load, a voltage raising command will be sent.

It should be noted that, in an embodiment, the single board energy-saving control module 120 may also be a processor with low power consumption, such as a 51 single chip computer, which reads through a serial control bus the real-time power of the single board output by the power calculation module 110. The serial control bus may be a commonly-used one, such as an $I^2C$ bus or an SPI bus.

It should be noted that, in another embodiment, to avoid repetitive change of the single board voltage controlled by the single board energy-saving control module 120, which is caused by the power of the single board varying around the threshold power, a retarding power $\Delta P$ may be added to the threshold power when the load of the single board is judged to be a light load. That is, only when the real-time power of the single board is lower than the difference between the threshold power and the retarding power $\Delta P$, the single board energy-saving control module 120 controls the power supply adjustment module 130 to lower the bus voltage of the single board.

Figure 5:
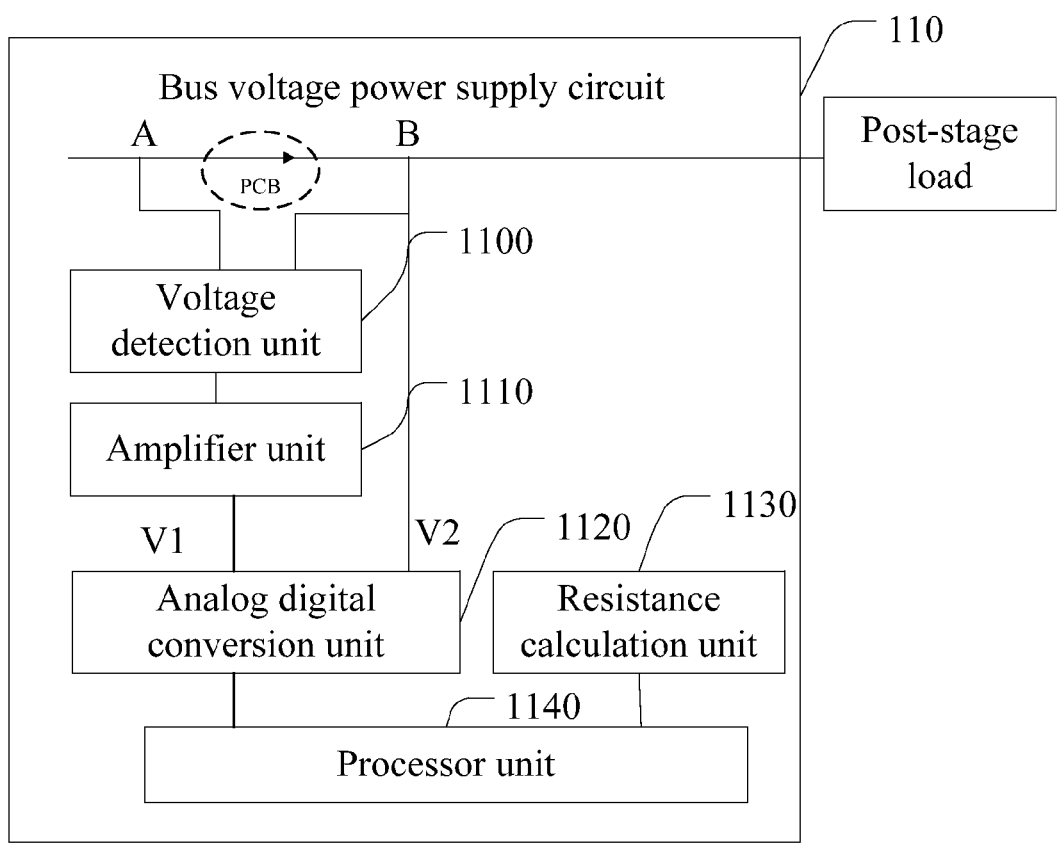
FIG. 5 is a schematic structural diagram of a power calculation module according to an embodiment of the present invention.

FIG. 5 is a schematic diagram of an implementation solution and structure of the power calculation module. The power calculation module 110 in the embodiment of the present invention calculates the current of the single board based on the voltage difference of a selected part of the PCB on the bus voltage power supply circuit of the single board and then calculates the power of the single board. In the embodiment of the present invention, the voltage difference of the preselected part of the PCB is the voltage difference between point A and point B on the bus voltage power supply circuit of the single board. The selected point A and point B in FIG. 5 is on the bus voltage power supply circuit of the single board, and the direction of a current of the single board is from point A to point B, as indicated by the arrow of FIG. 5. The PCB cabling between point A and point B is a regular PCB wiring, and is within the inner layer of the PCB. In another embodiment, it can be located in the outer layer of the PCB. Since the metal skin of the PCB has a resistance, there is a voltage difference between point A and point B. In the embodiment of the present invention, the metal skin of the PCB is a copper skin. In another embodiment, it can be a skin of another kind of metal. Specifically, As shown in FIG. 5, the power calculation module 110 may include: a voltage detection unit 1100, an amplifier unit 1110, an analogue digital conversion (ADC) unit 1120, a resistance calculation unit 1130, and a processor unit 1140.

The voltage detection unit 1100 is configured to detect a voltage difference of a preselected part of a PCB on a bus voltage power supply circuit of a single board. The voltage difference across the single board is configured to calculate an input current of the single board.

As shown in FIG. 5, the voltage detection unit 1100 calculates the input current of the single board based on a voltage difference between the preselected point A and point B on the bus voltage power supply circuit of the single board.

The amplifier unit 1110 is configured to amplify the voltage difference of the preselected part of the PCB, where the voltage difference is measured by the voltage detection unit.

As the voltage difference between point A and point B is generally little, for example, several dozens of millivolts, when being directly sent to the ADC unit 1120 for detection, the error will be huge. Therefore, it is necessary to amplify the voltage difference between point A and point B using the amplifier unit 1110. The amplified voltage difference is shown as V1 in FIG. 5. In another embodiment, the amplifier unit may be an amplifier, an operational amplifier, or an integrated operation amplifier.

The ADC unit 1120 is configured to convert the analogue voltage input by the amplifier unit 1110 into a digital one. The measured voltage is an analogue one, and needs to be converted into a digital one, so as to be displayed, and to be processed and stored more easily. In an embodiment, the ADC unit 1120 may be an ADC.

The resistance calculation unit 1130 is configured to calculate the actual resistance of the PCB under current temperature according to the nominal PCB resistance between point A and point B and current temperature.

Since the temperature of the working environment is not constant, in actual measurement, the resistance of the metal skin of the PCB is generally not a constant. Rather, it will vary with the influence of the temperature of the working environment. This variation will lead to a somewhat huge error of the ultimately measured current. Therefore, it is necessary to rectify the PCB resistance under current temperature according to the variation of the resistance of the PCB metal skin with the variation of the temperature.

According to the nominal resistance between point A and point B, and according to the current temperature, by a fitted equation regarding the variation of the resistance of the PCB metal skin with the temperature, which is obtained through previous measurement and fitting, an actual resistance of the PCB under current temperature may be calculated.

It should be noted that, the nominal resistance of the PCB is a resistance measured under a preset nominal temperature, which in this embodiment is 20° C. In another embodiment, it may be 25° C., 30° C., or other temperatures.

The processor unit 1140 is configured to calculate the real-time power of the single board, according to the voltage difference V1 between point A and point B, where the voltage difference V1 is output by the ADC unit 1120, the input voltage of the single board, which is previously measured at the end point B of this selected part of the PCB, and the actual resistance of the PCB metal skin under current temperature, where the actual resistance is calculated by the resistance calculation unit 1130. It is understandable that, in another embodiment, the input voltage of the single board may also be measured at point A. Since it is common to select a point closer to the post-stage load of the single board for measuring the input voltage of the single board, in the embodiment of the present invention, point B is chosen to be where the input voltage of the single board is measured.

Specifically, the voltage difference V1 between point A and point B, where the voltage difference V1 is output by the ADC unit 1120, is divided by the actual resistance of the PCB metal skin under current temperature, where the actual resistance is output by the resistance calculation unit 1130, and the current of the PCB, that is, the output current of the single board is calculated. Further, the real-time power of the single board is calculated according to a product of the current of the single board and the voltage V2 of point B as output by the ADC unit 1120.

Figure 6:
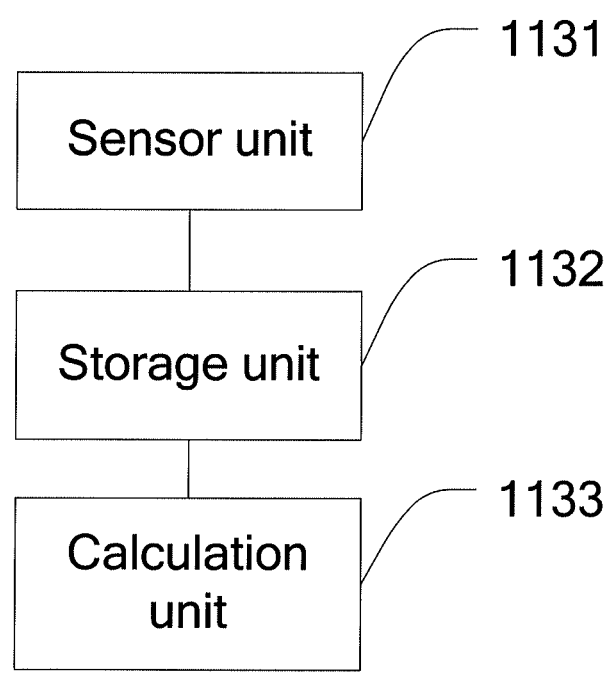
FIG. 6 is a schematic structural diagram of a resistance calculation module according to an embodiment of the present invention.

Further, as shown in FIG. 6, the resistance calculation unit 1130 may include a sensor unit 1131, a storage unit 1132, and a calculation unit 1133.

The sensor unit 1131 is configured to measure the actual temperature.

The storage unit 1132 is configured to store the nominal resistance and the current actual temperature.

The calculation unit 1133 is configured to calculate the actual resistance of the PCB according to the nominal resistance and the current actual temperature stored by the storage unit 1132, and through a fitted equation regarding the variation of the resistance of the PCB metal skin with temperature, which is obtained through previous measurement and fitting.

It should be noted that the nominal resistance of the PCB is a resistance measured under a preset nominal temperature. In the embodiment it is 20° C. In another embodiment, it may be 25° C., 30° C., or other temperatures.

Figure 7:
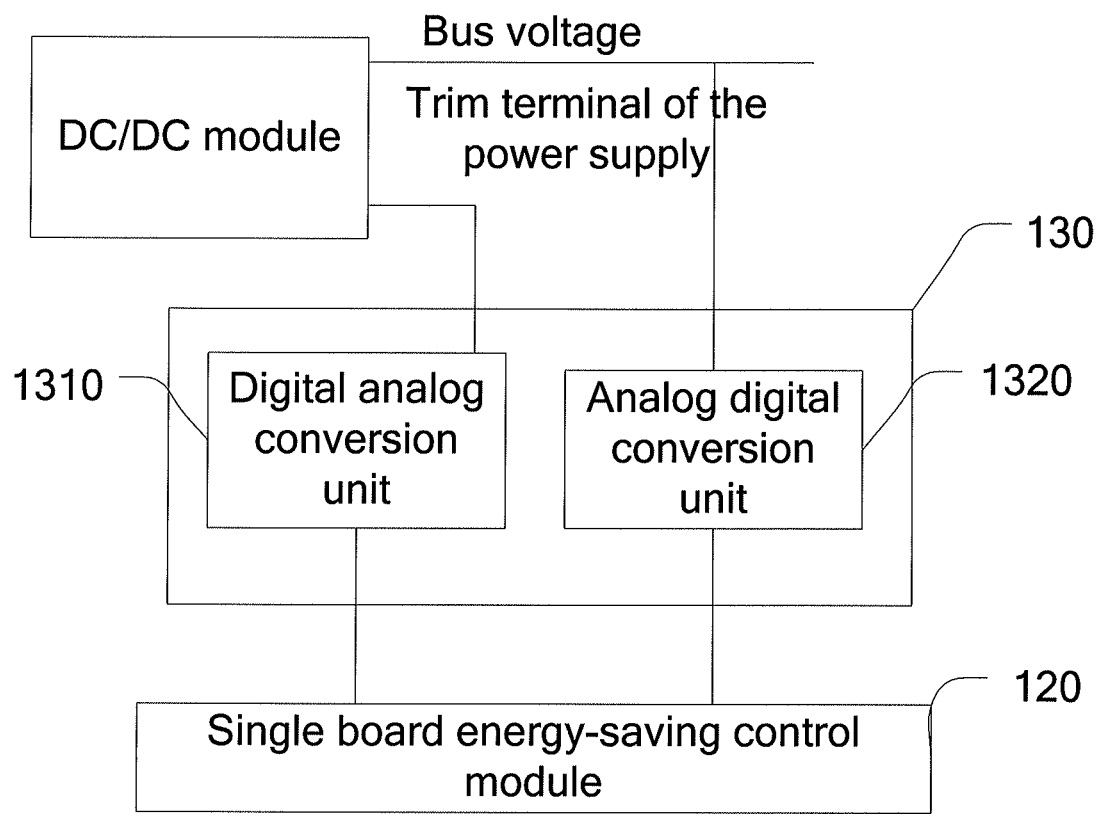
FIG. 7 is a schematic structural diagram of a power supply adjustment module according to an embodiment of the present invention.

As shown in FIG. 7, the power supply adjustment module 130 may include a digital analogue conversion (DAC) unit 1310 and an analogue digital conversion (ADC) unit 1320.

The DAC unit 1310 receives a digital control signal of the single board energy-saving control module 120, that is, a voltage adjustment command of the single board. The output voltage of the analog end is adjusted according to the digital control signal. The output voltage is directly fed back to the trim terminal of the DC/DC module, thereby adjusting the voltage of the trim terminal. Correspondingly, the output voltage of the DC/DC module, that is, the bus voltage of the single board, is adjusted.

That is, the DAC unit 1310 receives a digital quantity input by the single board energy-saving control module 120, converts this digital quantity into a corresponding analog quantity, and feeds this analog quantity back to the trim terminal of the power supply, thereby adjusting the bus voltage of the single board.

The ADC unit 1320 converts the measured bus voltage of the single board into a corresponding digital quantity and feeds it back to the single board energy-saving module 120.

After receiving the digital quantity fed back by the ADC unit 1320, the single board energy-saving module 120 determines, according to this digital quantity, whether the bus voltage of the single board has been adjusted to an appropriate voltage. If it is not adjusted to an appropriate voltage, the single board energy-saving module 120 will continue to control the DAC unit 1310 to adjust the bus voltage of the single board.

As shown in FIG. 8, in another embodiment, the power supply adjustment module 130 may include a digital potentiometer 1330 and an ADC unit 1320.

The digital potentiometer 1330 is configured to divide the bus voltage of the single board and feed the divided voltage back to the trim terminal of the DC/DC module.

The single board energy-saving module 120 may adjust the adjustable resistance of the digital potentiometer by using a control bus, thereby changing the divided voltage of the bus voltage of the single board. Then the voltage fed back to the DC/DC module is changed, and the bus voltage of the single board is changed correspondingly. It should be noted that, in an embodiment, the single board energy-saving control module may control the digital potentiometer by using a serial control bus. In another embodiment, the single board energy-saving control module may control the digital potentiometer by using a parallel control bus.

The ADC unit 1320 converts the bus voltage of the single board into a corresponding digital quantity and feeds it back to the single board energy-saving module 120.

After receiving the digital quantity fed back by the ADC unit 130, the single board energy-saving module 120 determines whether the bus voltage of the single board has been adjusted to an appropriate voltage according to this digital quantity. If it has not been adjusted to an appropriate voltage, the single board energy-saving module 120 will continue to control the digital potentiometer 1330 to adjust the bus voltage of the single board.

It should be noted that the DC/DC modules in the embodiments of the present invention all refer to the bus voltage front-stage DC/DC module.

Through the foregoing technical solution in the embodiments of the present invention, the voltage difference of a part of a PCB on a bus voltage power supply circuit of a single board is selected for calculating the current and the real-time power of the single board. When the current is relatively large, excessive thermal loss will not occur, and therefore, extra heat dissipation is not needed. The load condition of the single board is determined according to the real-time power of the single board. When the load of the single board is a light one, the bus voltage of the single board is lowered; when the load is a heavy one, the bus voltage of the single board is raised again to avoid overcurrent and overtemperature protection, so that the single board runs at a reliable and highly efficient operating point. The bus voltage of the single board is dynamically adjusted according to the requirement of the load of the single board, which increases the overall efficiency of the single board and realizes the energy-saving of the single board.

Figure 9:
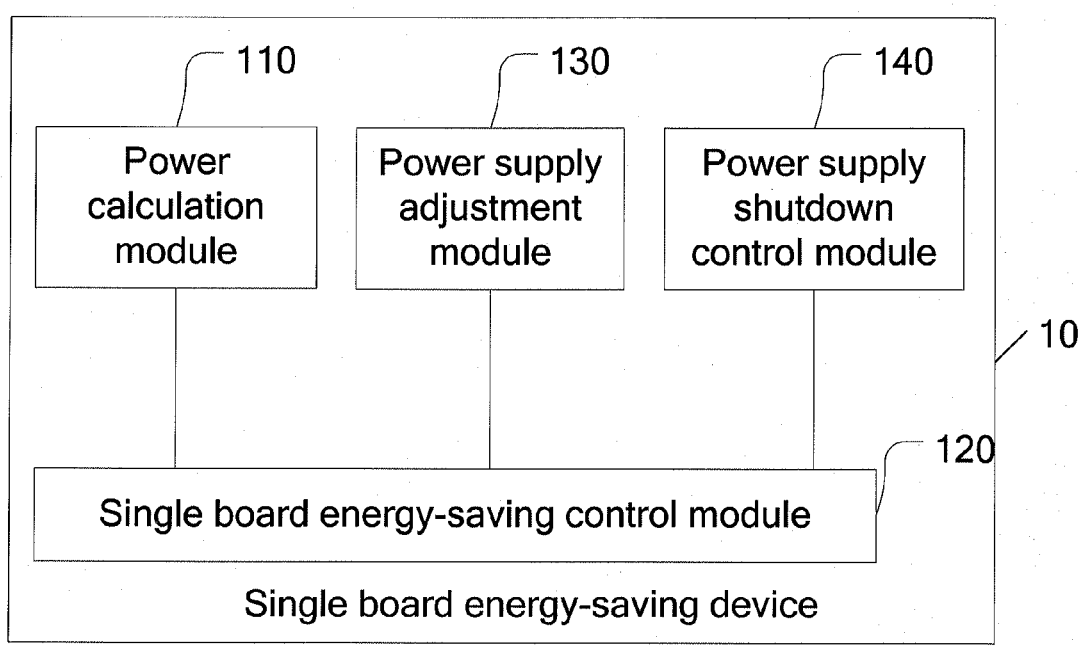
FIG. 9 is a schematic diagram of a single board energy-saving device according to an embodiment of the present invention.

As shown in FIG. 9, in another embodiment of the present invention, the single board energy-saving control device 10 may also include:

a power supply shutdown control module 140, configured to shut down the DC/DC module of the single board and implement power-off of the single board when it is not necessary for the single board to work.

When the single board does not need to work, the single board energy-saving module 120 will send an electrical level signal, which may be a general IO (Input and Output) signal in another embodiment, for controlling the power supply to shut down the control module and implementing the power-off of the single board. The power supply shutdown control module 140 receives this electrical level signal, converts the electrical level signal into a signal for controlling the shutdown of the DC/DC module, sends this shutdown signal to the enabling end of the DC/DC module, shuts down the DC/DC module of the single board, and cuts off the bus voltage of the single board for power-off of the single board.

Since the power of the single board energy-saving control module 120 is supplied by an outside independent power supply, when the single board is powered off, the single board energy-saving control module 120 can continue to work. When it is necessary to power on the single board, the single board energy-saving control module 120 controls the power supply shutdown control module to power on the single board.

It should be noted that, in an embodiment, the power supply shutdown control module 140 can be a photocoupler. In another embodiment, it can be other modules or devices capable of photoelectric conversion.

Figure 10:
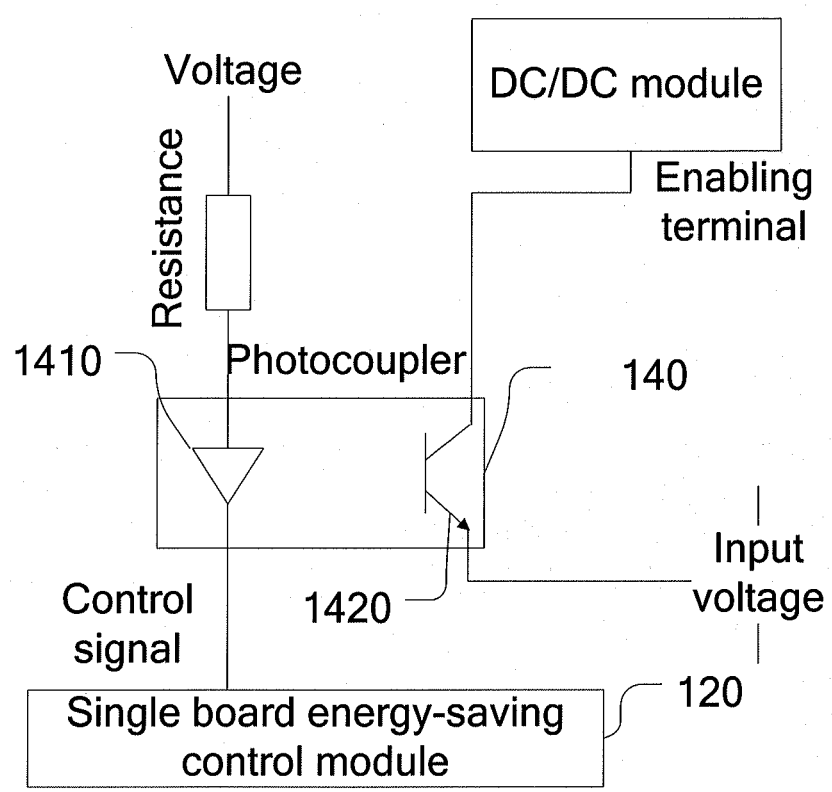
FIG. 10 is a schematic structural diagram of a power supply shutdown control module according to an embodiment of the present invention.

As shown in FIG. 10, in an embodiment, the power supply shutdown control module can be a photocoupler 140. The photocoupler 140 includes a light-emitting diode (LED) 1410 and a photistor 1420. The resistance in this figure is the resistance of the single board itself.

The single board energy-saving control module 120 drives the turn-on and shut-down of the photocoupler 140 through a general IO signal. When the photocoupler 140 is turned on, the DC/DC module can be turned on by the photocoupler 140 controlling the enabling terminal of the DC/DC module. If the DC/DC module needs to be shut down, the single board energy-saving controller shuts down the photocoupler through an IO control signal.

Specifically, when powering on the single board, the IO signal is an electrical level signal, and forms a voltage difference with the voltage of the resistance. Then, the LED 1410 of the photocoupler will be turned on, and then emit light. The photistor 1420 is turned on, and thereby the enabling terminal of the DC/DC module is activated; the DC/DC module is turned on, and the single board is powered on.

If the DC/DC module needs to be shut down to power off the single board, the single board energy-saving control module 120 sends an IO signal to the photocoupler 140. The IO signal is an electrical level signal, which has a certain voltage. After the voltage interacts with the voltage of the resistance in FIG. 10, the voltage difference across the LED 1410 in the photocoupler 140 is insufficient to turn on the LED 1410. Then the LED 1410 is cut off, and the light source diminishes. Correspondingly, the photistor 1420 is also turned off, which shuts down the enabling terminal of the DC/DC module, shuts down the DC/DC module, and powers off the single board.

It should be noted that the DC/DC modules in the embodiments of the present invention all refer to the bus voltage front-stage DC/DC module.

It is understandable that, in the embodiment, the power supply shutdown control module 140 is a photocoupler. In another embodiment, it can be other modules or devices capable of photoelectric conversion.

Through the foregoing technical solution in the embodiments of the present invention, the voltage difference of a part of the PCB on the bus voltage power supply circuit of a single board is selected for calculating the current and real-time power of the single board. When the current is relatively large, excessive thermal loss will not occur, and therefore, extra heat dissipation is not needed. The load condition of the single board is determined according to the real-time power of the single board. When the load of the single board is a light one, the bus voltage of the single board is lowered; when the load is a heavy one, the bus voltage of the single board is raised again to avoid overcurrent and overtemperature protection, so that the single board runs at a reliable and highly efficient operating point. The bus voltage of the single board is dynamically adjusted according to the requirement of the load of the single board, which increases the overall efficiency of the single board and realizes the energy-saving of the single board. Further, when the single board does not need to work, the power supply of the single board is shut down, and the single board is powered off for further energy-saving.

Figure 11:
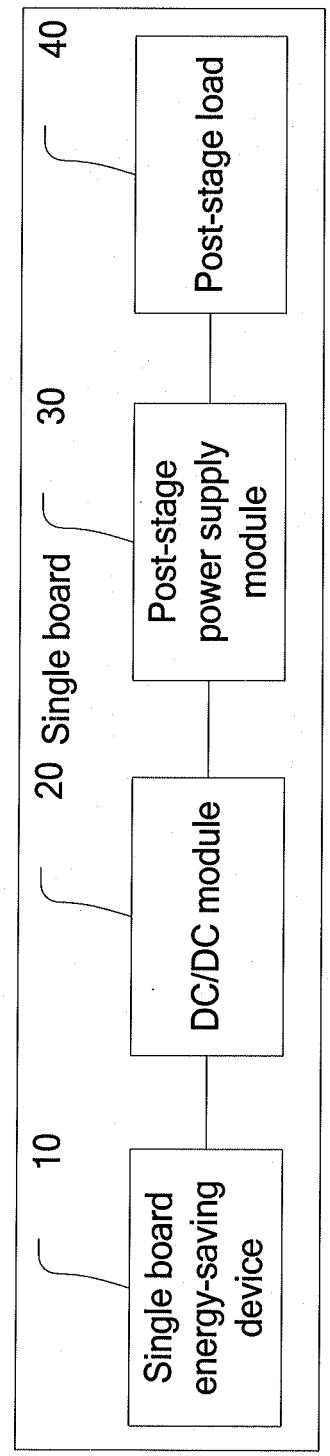
FIG. 11 is a schematic structural diagram of a single board according to an embodiment of the present invention.

As shown in FIG. 11, an embodiment of the present invention provides a single board, which includes a single board energy-saving device provided by FIGS. 3 to 10, and includes a DC/DC module 20, a post-stage power supply module 30, and a post-stage load 40.

The DC/DC module 20 is configured to convert an input voltage of a single board into a bus voltage of the single board.

It should be noted that, the DC/DC module in the embodiment of the present invention may be the same as the DC/DC modules mentioned in the previous embodiments. The bus voltage of the single board is used for supplying power to the post-stage power supply module 30 of the single board, which converts the bus voltage of the single board into a voltage needed by the post-stage load 40.

The single board energy-saving device 10 is configured to detect the input voltage and current of the single board, calculate real-time power of the single board according to the detected input voltage and the current of the single board, determine load condition of the single board according to the real-time power of the single board, and adjust the bus voltage of the single board according to the load condition of the single board.

When determining that the load of the single board is a light one, the single board energy-saving device 10 lowers the bus voltage of the single board. Lowering the bus voltage of the single board increases the overall power supply efficiency of the single board, as shown in FIG. 2, therefore realizing energy saving. When the single board energy-saving device determines that the load of the single board is a heavy one, to avoid that the bus voltage of the single board running at a lowered level causes the overcurrent and overtemperature protection, the bus voltage of the single board needs to be raised again, so that the single board runs at a relatively more reliable and highly efficient operating point, and the energy saving is dynamically realized.

In an embodiment of the present invention, structure of a single board energy-saving device 10 is shown in FIG. 3. Specific structure of each component module is shown in FIGS. 4 to 8. In another embodiment of the present invention, structure of a single board energy-saving device may also be as shown in FIG. 9. That is, compared with the single board energy-saving device shown in FIG. 3, the one in FIG. 9 includes an additional power supply shutdown control module 140, with the specific structures of its component modules shown in FIGS. 4 to 8 and 10. Specific function of each component module has been described in detail in previous embodiments, and therefore, redundant description is omitted.

It should be noted that the DC/DC modules in the embodiments of the present invention all refer to the bus voltage front-stage DC/DC modules.

Through the foregoing technical solution in the embodiments of the present invention, the voltage difference of a part of a PCB on a bus voltage power supply circuit of a single board is selected for calculating the current and real-time power of the single board. When the current is relatively large, excessive thermal loss will not occur, and therefore, extra heat dissipation is not needed. Load condition of the single board is determined according to the real-time power of the single board. When the load of the single board is a light one, the bus voltage of the single board is lowered; when the load is a heavy one, the bus voltage of the single board is raised again to avoid overcurrent and overtemperature protection, so that the single board runs at a reliable and highly efficient operating point. The bus voltage of the single board is dynamically adjusted according to the requirement of the load of the single board, which increases the overall efficiency of the single board and realizes the energy-saving of the single board. Further, when the single board does not need to work, the power supply of the single board is shut down, and the single board is powered off for further energy-saving.

Figure 12:
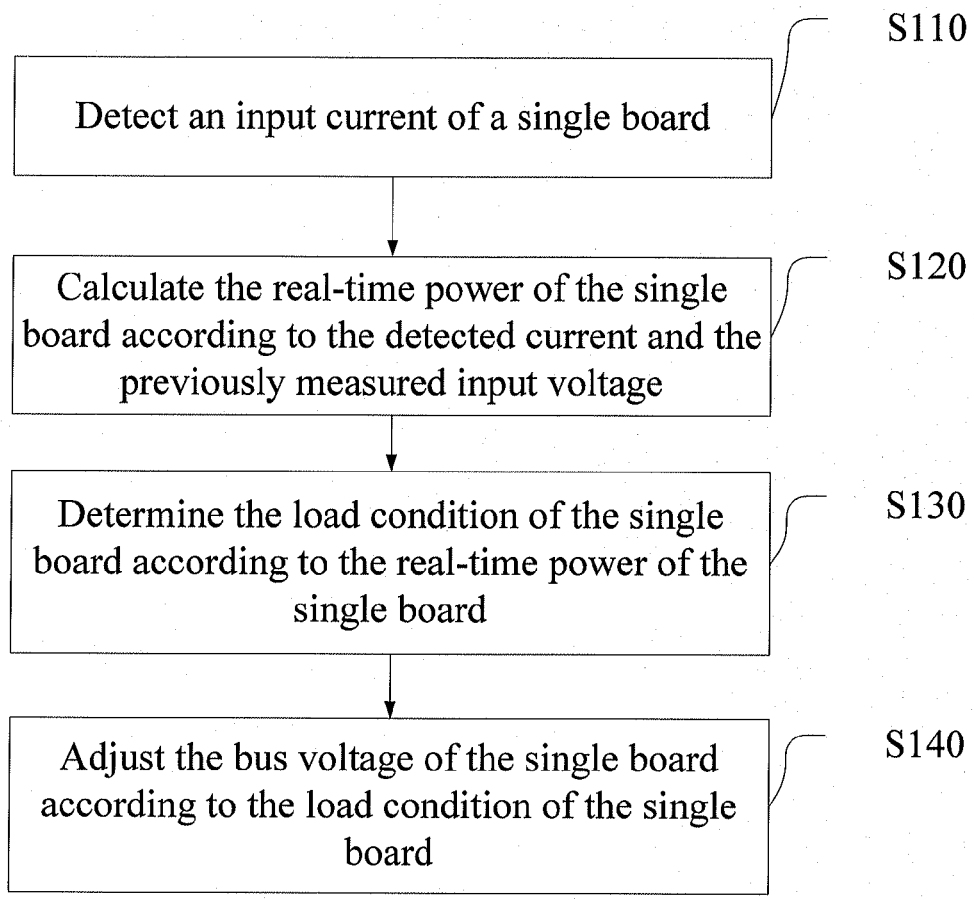
FIG. 12 is a flow chart of a single board energy-saving method according to an embodiment of the present invention.

As shown in FIG. 12, an embodiment of the present invention provides a single board energy-saving method, including:

S110: Detect and obtain an input current of a single board.

On the bus voltage power supply circuit of the single board, a part of a PCB is selected for measuring the voltage difference of the selected PCB. As the metal skin of the single board (usually a copper skin) has a resistance, the input current of the single board can be calculated according to the measured voltage difference of the PCB. The input voltage of the single board is measured at a preselected voltage point.

S120: Calculate the real-time power of the single board according to the input current and the previously measured and obtained input voltage of the single board.

The input current of the single board is multiplied with the input voltage of the single board, and then the real-time power of the single board can be obtained. The input voltage of the single board is measured at a preselected voltage point.

S130: Determine the load condition of the single board according to the real-time power of the single board.

S140: Adjust the bus voltage of the single board according to the load condition of the single board.

In the foregoing procedure, in step S130, judging the load condition of the single board may be: comparing the real-time power of the single board with a preset threshold power and obtaining the load condition of the single board. Thereafter, the bus voltage of the single board is dynamically adjusted according to the load condition of the single board, so that the single board always runs at a reliable and highly efficient operating point, and dynamic energy saving is realized.

Through the foregoing technical solution in the embodiments of the present invention, the voltage difference of a part of a PCB on a bus voltage power supply circuit of a single board is selected for calculating the current and real-time power of the single board. When the current is relatively large, excessive thermal loss will not occur, and therefore, extra heat dissipation is not needed. The load condition of the single board is determined according to the real-time power of the single board. Further, the bus voltage of the single board is dynamically adjusted according to the load condition of the single board, and the dynamic energy saving is realized.

Figure 13:
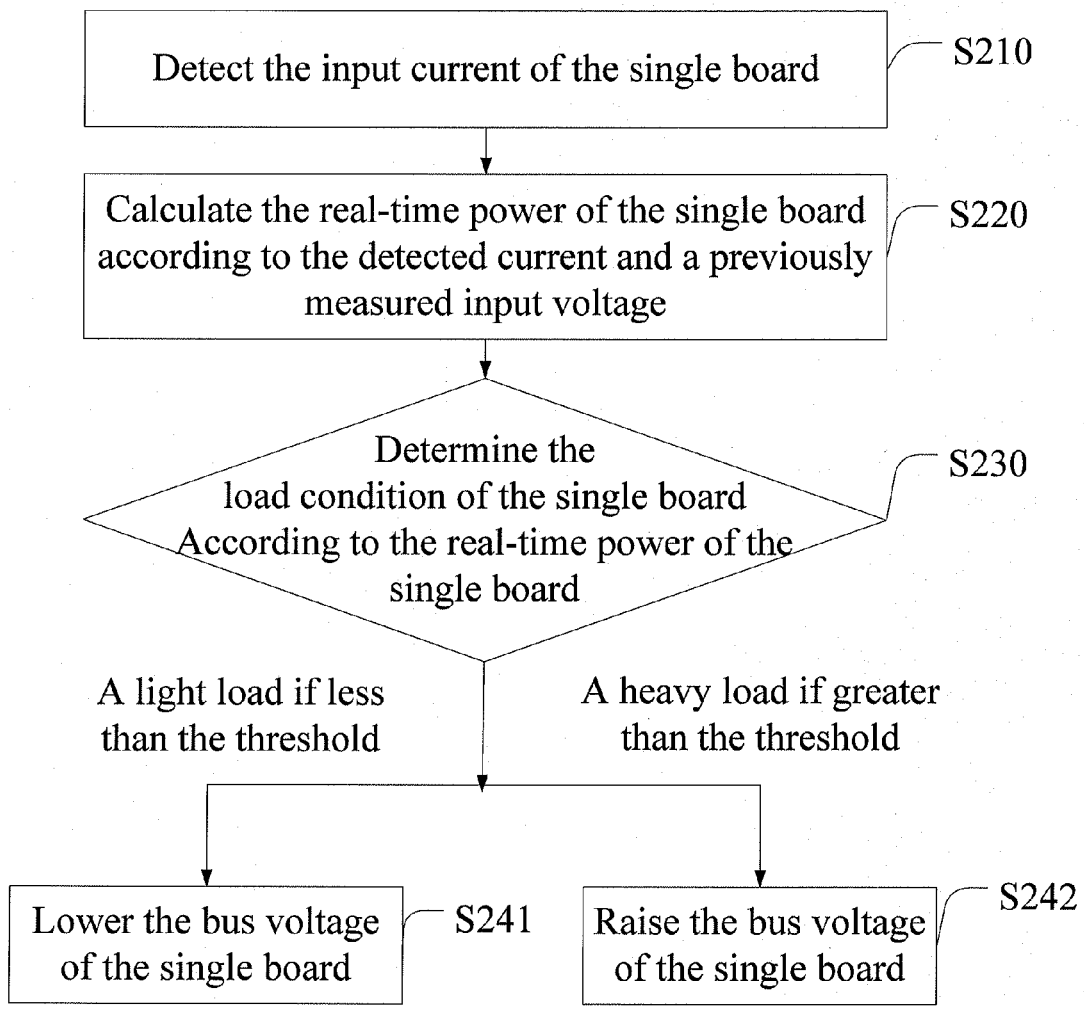
FIG. 13 is a flow chart of a single board energy-saving method according to an embodiment of the present invention.

As shown in FIG. 13, an embodiment of the present invention provides a single board energy-saving method, including:

S210: Detect an input current of a single board.

On the bus voltage power supply circuit of the single board, a part of the PCB is selected for measuring the voltage difference of the selected PCB. As the metal skin of the single board (usually a copper skin) has a resistance, the input current of the single board can be calculated based on the measured voltage difference of the PCB. The input voltage of the single board is measured at a preselected voltage point.

S220: Calculate the real-time power of the single board according to the input current and the previously measured and obtained input voltage of the single board.

The input current of the single board is multiplied with the input voltage of the single board, and the real-time power of the single board is obtained. The input voltage of the single board is measured at a preselected voltage point.

S230 to S242: Determine the load condition of the single board according to the real-time power of the single board. If the real-time power of the single board is lower than a preset threshold power, the load of the single board is determined to be a light one and the bus voltage of the single board is lowered; if the real-time power of the single board is higher than the preset threshold power, the load of the single board is determined to be a heavy one and the bus voltage of the single board is raised.

Through the foregoing technical solutions, according to embodiments of the present invention, the voltage difference of a part of a PCB on a bus voltage power supply circuit of a single board is selected for calculating the current and real-time power of the single board. When the current is relatively large, excessive thermal loss will not occur, and therefore, extra heat dissipation is not needed. The load condition of the single board is determined according to the real-time power of the single board. Further, the bus voltage of the single board is dynamically adjusted based on the load condition of the single board, and dynamic energy-saving is realized.

Figure 14:
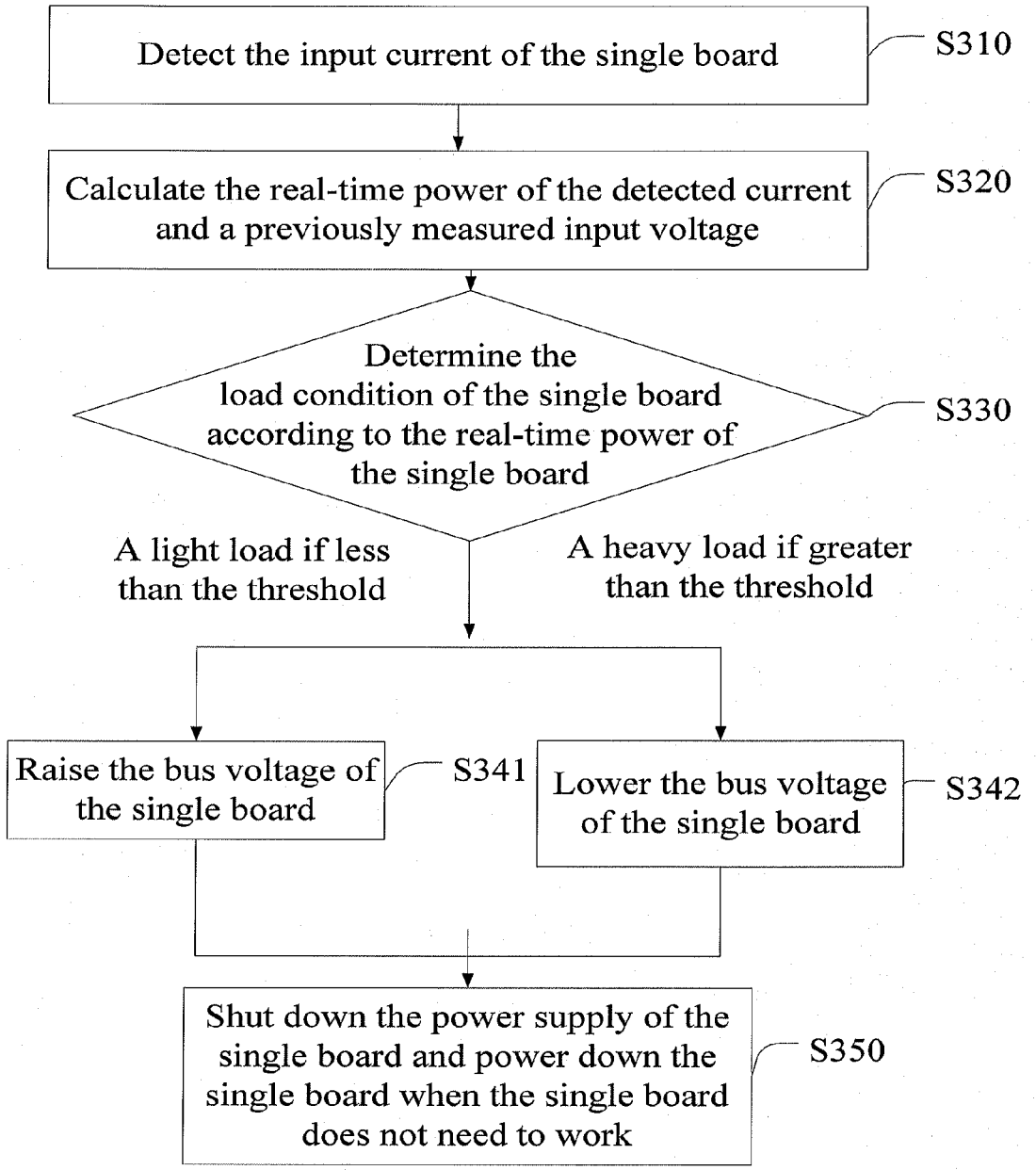
FIG. 14 is a flow chart of a single board energy-saving method according to an embodiment of the present invention.

As shown in FIG. 14, an embodiment of the present invention provides a single board energy-saving method. What is different from the single board energy-saving methods shown in FIGS. 12 and 13 is that the single board energy-saving method provided by the embodiment in FIG. 14 further includes:

S350: When the single board does not need to work, shut down the power supply module of the single board and power off the single board.

When the single board does not need to work, for example, when the single board fails or the single board has not been assigned with a service, the power supply module of the single board is shut down at this time and the single board is powered off, so that energy saving is realized when the single board does not need to work.

Through the foregoing technical solution in the embodiments of the present invention, the voltage difference of a part of a PCB on a bus voltage power supply circuit of a single board is selected for calculating the current and real-time power of the single board. When the current is relatively large, excessive thermal loss will not occur, and therefore, extra heat dissipation is not needed. The load condition of the single board is determined according to the real-time power of the single board. The bus voltage of the single board is dynamically adjusted according to the load condition of the single board, which realizes the dynamic energy-saving. Further, when the single board does not need to work, the power supply of the single board is shut down, which powers down the single board and realizes further energy-saving for the single board.

The foregoing are merely some embodiments of the present invention. According to what is disclosed in the application document, those skilled in the art may modify or alter the present invention in various manners without departing from the spirit and scope of the present invention.

What is claimed is:

1. A single board energy-saving device, comprising:
a power calculation module, configured to detect an input current of a single board, and calculate a real-time power of the single board according to the detected input current and a measured input voltage of the single board, wherein the power calculation module comprises:
a voltage detection unit, configured to measure a voltage difference of a preselected part of a Printed Circuit Board (PCB) on a bus voltage power supply circuit, wherein the voltage difference of the PCB is used for calculating the input current of the single board;
an amplifier unit, configured to amplify the voltage difference of the PCB;
an analog digital conversion unit, configured to convert the voltage difference amplified by the amplifier unit into a corresponding digital voltage;
a resistance calculation unit, configured to calculate an actual resistance of the PCB according to a nominal resistance of the PCB and current temperature, and through an equation obtained by fitting results from a previous measurement; and
a processor unit, configured to calculate the input current of the single board according to the corresponding digital voltage and the actual resistance of the PCB, and calculate the real-time power of the single board according to the input current and the measured input voltage of the single board;
a single board energy-saving control module, configured to determine a load condition of the single board according to the real-time power, and send a voltage adjustment command according to the load condition; and
a power supply adjustment module, configured to receive the voltage adjustment command and adjust a bus voltage of the single board according to the voltage adjustment command.

2. The single board energy-saving device according to claim 1, wherein the single board energy-saving control module comprises:
a load determination module, configured to compare the real-time power with a preset threshold power; if the real-time power is lower than the preset threshold power, the load condition of the single board is determined to be a light load, and if the real-time power is higher than the preset threshold power, the load condition of the single board is determined to be a heavy load; and
an adjustment command sending module, configured to send a corresponding voltage adjustment command according to the determination result of the load determination module; if the load determination module determines that the load condition of the single board is the light load, a voltage lowering command is sent, and if the load determination module determines that the load condition of the single board is the heavy load, a voltage raising command is sent.

3. The single board energy-saving device according to claim 1, wherein the power supply adjustment module comprises:
a digital analog conversion unit, configured to receive the voltage adjustment command of the single board energy-saving control module, convert the voltage adjustment command into a corresponding analog quantity, return the analog quantity to an output voltage adjusting terminal, a Trim terminal, of a direct current/direct current (DC/DC) module on a power supply of the single board, and adjust a voltage of the Trim terminal, thereby adjusting the bus voltage of the single board; and
an analog digital conversion unit, configured to convert the adjusted bus voltage of the single board, where the adjusted bus voltage is measured, into a corresponding digital number, return the digital number to the single board energy-saving control module, wherein the single board energy-saving control module determines, according to the digital number, whether the bus voltage of the single board is adjusted to a desired value, and if the bus voltage is not adjusted to the desired value, the single board energy-saving control module continues to send the voltage adjustment command.

4. The single board energy-saving device according to claim 1, wherein the power supply adjustment module comprises:

a digital potentiometer, configured to receive the voltage adjustment command of the single board energy-saving control module, adjust a digital adjustable resistance of the digital potentiometer according to the voltage adjustment command, wherein the digital adjustable resistance is used for dividing the bus voltage of the single board, return the divided voltage to a Trim terminal of a direct current/direct current (DC/DC) module of the single board, and adjust a voltage of the Trim terminal, thereby adjusting the bus voltage of the single board; and an analog digital conversion unit, configured to convert a measured analog voltage value of the adjusted bus voltage of the single board, into a corresponding digital number, return the digital number to the single board energy-saving control module, wherein the single board energy-saving control module determines whether the bus voltage of the single board is adjusted to a desired value according to the digital number, and if the bus voltage is not adjusted to the desired value, the single board energy-saving control module continues to send the voltage adjustment command.

5. The single board energy-saving device according to claim 1, wherein the single board energy-saving control module is configured to send an electrical level signal when the single board does not need to work.

6. The single board energy-saving device according to claim 5, further comprising:

a power supply shutdown control module, configured to receive the electrical level signal sent by the single board energy-saving control module when the single board does not need to work, convert the electrical level signal into a signal controlling shutdown of the single board power supply module, shut down the power supply module of the single board, and powering off the single board.

7. The single board energy-saving device according to claim 6, wherein the power supply shutdown control module comprises a photocoupler.

8. A single board energy-saving method, comprising:

detecting and obtaining an input current of a single board;

calculating a real-time power of the single board according to the input current and a measured input voltage of the single board, wherein the real-time power calculation comprising:

utilizing a voltage detection unit, configured to measure a voltage difference of a preselected part of a Printed Circuit Board (PCB) on a bus voltage power supply circuit, wherein the voltage difference of the PCB is used for calculating the input current of the single board;

utilizing an amplifier unit, configured to amplify the voltage difference of the PCB;

utilizing an analog digital conversion unit, configured to convert the voltage difference amplified by the amplifier unit into a corresponding digital voltage;

utilizing a resistance calculation unit, configured to calculate an actual resistance of the PCB according to a nominal resistance of the PCB and current temperature, and through an equation obtained by fitting results from a previous measurement; and utilizing a processor unit, configured to calculate the input current of the single board according to the corresponding digital voltage and the actual resistance of the PCB, and calculate the real-time power of the single board according to the input current and the measured input voltage of the single board; and determining a load condition of the single board according to the real-time power of the single board, and adjusting a bus voltage of the single board according to the load condition.

9. The single board energy-saving method according to claim 8, wherein the input current of the single board is measured at a preselected part of a Printed Circuit Board (PCB) on a bus voltage power supply circuit of the single board.

10. The single board energy-saving method according to claim 8, wherein the determining of the load condition the single board comprising:

comparing the real-time power with a preset threshold power, wherein if the real-time power is lower than the preset threshold power, the load condition of the single board is determined to be a light load, and the bus voltage of the single board is lowered; and if the real-time power is higher than the preset threshold power, the load condition of the single board is determined to be a heavy load, and the bus voltage of the single board is raised.

11. A single board, comprising:

a post-stage power supply module and a post-stage load, wherein the post-stage power supply module is configured to supply power to the post-stage load;

a direct current/direct current (DC/DC) module, configured to convert an input voltage of the single board into a bus voltage of the single board; the bus voltage of the single board supplies power to the post-stage power supply module, and the post-stage power supply module is configured to convert the bus voltage of the single board into a voltage needed by the post-stage load; and a single board energy-saving device, configured to detect an input current of the single board, calculate a real-time power of the single board according to the input voltage of the single board, determine a load condition of the single board according to the real-time power of the single board, and adjust the bus voltage of the single board according to the load condition of the single board, wherein the single board energy-saving device comprises:

a voltage detection unit, configured to measure a voltage difference of a preselected part of a Printed Circuit Board (PCB) on a bus voltage power supply circuit, wherein the voltage difference of the PCB is used for calculating the input current of the single board;

an amplifier unit, configured to amplify the voltage difference of the PCB;

an analog digital conversion unit, configured to convert the voltage difference amplified by the amplifier unit into a corresponding digital voltage;

a resistance calculation unit, configured to calculate an actual resistance of the PCB according to a nominal resistance of the PCB and current temperature, and through an equation obtained by fitting results from a previous measurement; and a processor unit, configured to calculate the input current of the single board according to the corresponding digital voltage and the actual resistance of the PCB, and calculate the real-time power of the single board according to the input current and the measured input voltage of the single board.

12. The single board according to claim 11, wherein the single board energy-saving device is configured to detect the input current of the single board, calculate the real-time power of the single board based on the measured input voltage of the single board, and compare the real-time power with a preset threshold power, wherein if the real-time power is lower than the preset threshold power, the load of the single board is determined to be a light load, and a voltage lowering command is sent; if the real-time power is higher than the preset threshold power, the load of the single board is determined to be a heavy load, and a voltage raising command is sent.

* * * * *